US008100245B2

(12) United States Patent
Numata et al.

(10) Patent No.: US 8,100,245 B2
(45) Date of Patent: Jan. 24, 2012

(54) BILL RECOGNIZING AND COUNTING APPARATUS

(75) Inventors: Toshio Numata, Hyogo (JP); Shinji Matsuura, Hyogo (JP); Teruo Sudo, Hyogo (JP); Tomoyasu Sato, Hyogo (JP); Yasutaka Toyoda, Hyogo (JP)

(73) Assignee: Glory Ltd., Himeji-shi (JP)

( * ) Notice: Subject to any disclaimer, the term of this patent is extended or adjusted under 35 U.S.C. 154(b) by 274 days.

(21) Appl. No.: 12/446,352

(22) PCT Filed: Oct. 24, 2006

(86) PCT No.: PCT/JP2006/321801

§ 371 (c)(1), (2), (4) Date: Apr. 20, 2009

(87) PCT Pub. No.: WO2008/050462

PCT Pub. Date: May 2, 2008

(65) Prior Publication Data

US 2011/0004336 A1 Jan. 6, 2011

(51) Int. Cl.
*G06F 7/04* (2006.01)

(52) U.S. Cl. .......................... 194/207; 194/205; 194/334

(58) Field of Classification Search ................... 194/207
See application file for complete search history.

(56) References Cited

U.S. PATENT DOCUMENTS

| | | | | |
|---|---|---|---|---|
| 5,737,418 | A * | 4/1998 | Saffari et al. | 713/176 |
| 6,393,140 | B1 * | 5/2002 | Itako | 382/135 |
| 6,621,919 | B2 * | 9/2003 | Mennie et al. | 382/135 |
| 6,868,173 | B1 | 3/2005 | Sakai et al. | |
| 2002/0153412 | A1 | 10/2002 | Numata et al. | |
| 2005/0108165 | A1 | 5/2005 | Jones et al. | |

FOREIGN PATENT DOCUMENTS

| | | | |
|---|---|---|---|
| CN | 1064465 | C | 4/2001 |
| CN | 1296600 | A | 5/2001 |
| JP | 01-108697 | A | 4/1989 |
| JP | 05-182063 | A | 7/1993 |
| JP | 2000-251106 | A | 9/2000 |
| JP | 2002-279477 | A | 9/2002 |
| WO | WO 99/48040 | A1 | 9/1999 |
| WO | WO 02/29735 | A2 | 4/2002 |

* cited by examiner

*Primary Examiner* — Mark Beauchaine

(74) *Attorney, Agent, or Firm* — Foley & Lardner LLP

(57) ABSTRACT

A bill recognizing and counting apparatus includes a feeding and transporting mechanism; a line sensor to scan an image of the bills; a denomination determination table in which denomination recognition data is registered for at least one currency; a denomination recognizing unit that recognizes a denomination of the currency by referring to the table; a processing-mode switching unit that switches between a denomination mode and a different currency recognition mode; a different-currency recognizing unit that compares a difference in size between a first bill and each bill of a second bill and thereafter with an allowable range, and recognizes whether the each bill of the second bill and thereafter is of the same denomination as the first bill; and a control unit that guides the bill being determined as a different denomination to a rejecting unit or stops the feeding and transporting mechanism.

7 Claims, 7 Drawing Sheets

BILL RECOGNIZING AND COUNTING APPARATUS

TECHNICAL FIELD

The present invention relates to a bill recognizing and counting apparatus, and, more particularly to a bill recognizing and counting apparatus applicable even to a currency, for which a denomination determination table is not prepared.

BACKGROUND ART

As an apparatus for determining authenticity of bills, which determines authenticity of a secondly met bill and thereafter based on a first encountered bill, for example, there is an apparatus disclosed in Japanese Patent Application Laid-open No. 2002-279477 filed by the present applicant.

In the technique disclosed in the above publication, an authenticity/counterfeit determining unit is constituted by a plurality of detectors having different determination principles, the presence of output in each detector is stored in a memory for the firstly fed bill, and when there is a difference between the firstly fed bill and the secondly fed bill and thereafter, it is determined that the bill is a counterfeit bill.

In countries around the Eurozone, a bill recognizing and counting apparatus that can recognize not only Euro bills but also the currency of the own country has been desired.

Specifically, in Czech Republic, there are high demands for a bill recognizing and counting apparatus that can recognize bills of Koruna, which is Czech's own currency, and the Euro bills.

The Euro bills are unified currency, and suppliers of bill recognizing and counting apparatus recognize that recognition of the Euro bills is a necessary condition. However, to recognize also the currency of an individual country, the cost of development increases not only in Czech Republic but also in other countries, thereby making it difficult to respond to the demands.

DISCLOSURE OF INVENTION

The apparatus in the conventional art exemplified as the background art is limited to authenticity determination corresponding to the forgery prevention measure, and the determination technique cannot respond to the above demands.

The present invention has been made under the above circumstances, and an object of the present invention is to provide a bill recognizing and counting apparatus that can perform denomination recognition of a currency common to different countries, different denomination check of a currency of the own country, and authenticity determination by the same apparatus, by adopting a different currency recognition mode of processing the currency for which the denomination determination table is not prepared. Note that the "different denomination check" as referred to in the present invention means checking whether the denomination of all bills to be processed is the same. In other words, it is checked whether a bill of a different denomination is mixed in the bills to be processed.

A bill recognizing and counting apparatus according to an aspect of the present invention includes a feeding and transporting mechanism that feeds a plurality of bills placed on a hopper to a transport path one by one and transports the bills to a stacker or a rejecting unit; a line sensor provided at a predetermined position of the transport path to scan an image of the bills being transported; a denomination determination table in which denomination recognition data is registered for at least one currency; a denomination recognizing unit that recognizes a denomination of the at least one currency by referring to the denomination determination table; a processing-mode switching unit that switches between a denomination mode for the currency for which the denomination determination table is prepared, and a different currency recognition mode for a currency other than the currency for which the denomination determination table is prepared; a different-currency recognizing unit that compares a difference in size between a first bill and each bill of a second bill and thereafter with an allowable range, based on at least a lengthwise size of the first bill obtained by scanning by the line sensor, when the different currency recognition mode is set, and recognizes at least whether the each bill of the second bill and thereafter is of the same denomination as the first bill based on a comparison result; and a control unit that performs control for guiding the bill, which is determined as a different denomination by the different-currency recognizing unit, to the rejecting unit or control for stopping the feeding and transporting mechanism.

In the bill recognizing and counting apparatus, the line sensor may identify color of the bills, and when the different currency recognition mode is set, the different-currency recognizing unit may perform denomination recognition and authenticity determination of the bill, based on color information as well as the size. Further, in the bill recognizing and counting apparatus, the line sensor may scan an image by using light of an infrared region, and when the different-currency recognition mode is set, the different-currency recognizing unit may perform denomination recognition and authenticity determination of the bill, based on image information obtained by using the light of the infrared region as well as the size. Further, the bill recognizing and counting apparatus may further include a magnetic sensor that detects presence of magnetism on the bill in addition to the line sensor, and when the different currency recognition mode is set, the different-currency recognizing unit may perform denomination recognition and authenticity determination of the bill, based on the presence of magnetism as well as the size.

Further, in the bill recognizing and counting apparatus, a process for recognizing the denomination of the currency may be performed, by referring to the denomination determination table for the first bill, and when it is determined that denomination recognition data of the first bill is not registered in the denomination determination table, a bill processing mode may be automatically switched to the different currency recognition mode to perform the process in the different currency recognition mode. Further, the bill recognizing and counting apparatus may further include a determination-criteria changing unit that changes set information of the allowable range to an allowable range specified by an operator.

A bill recognizing and counting apparatus according to another aspect of the present invention includes a feeding and transporting mechanism that feeds a plurality of bills placed on a hopper to a transport path one by one and transports the bills to a stacker or a rejecting unit; a line sensor provided at a predetermined position of the transport path to scan an image of the bills being transported; a denomination determination table in which denomination recognition data is registered for at least one currency; a denomination recognizing unit that recognizes a denomination of the at least one currency by referring to the denomination determination table; a magnetic sensor that detects presence of magnetism on the bill; an infrared sensor that detects presence of reaction of the bill to light of an infrared region; a processing-mode switching unit that switches between a denomination mode for the currency for which the denomination determination table is prepared, and a different currency recognition mode for a currency other than the currency for which the denomination determination table is prepared; a different-currency recognizing unit that compares a difference between a first bill and each bill of a second bill and thereafter, based on at least a lengthwise size of the first bill obtained by scanning by the line sensor, the presence of magnetism obtained by the magnetic sensor, and the presence of reaction in the infrared region obtained by the infrared sensor, when the different currency recognition mode is set, and recognizes whether the each bill of the second bill and thereafter is of the same denomination as the first bill as well as performing authenticity determination of the bill, based on a comparison result; and a control unit that performs control for guiding the bill, which is determined as a different denomination or counterfeit by the different-currency recognizing unit, to the rejecting unit or control for stopping the feeding and transporting mechanism.

EFFECT OF THE INVENTION

According to the present invention, denomination recognition can be made with respect to the currency having the denomination determination table, and not only authenticity determination but also different denomination check can be performed with respect to the currency not having the denomination determination table by setting the different currency recognition mode. Therefore, denomination recognition of the currency common to different countries (for example, Euro bills) and different denomination check and authenticity determination of the currency of respective countries (for example, bills of own country in EURO) can be performed by the same apparatus.

BEST MODE(S) FOR CARRYING OUT THE INVENTION

Figure 1:
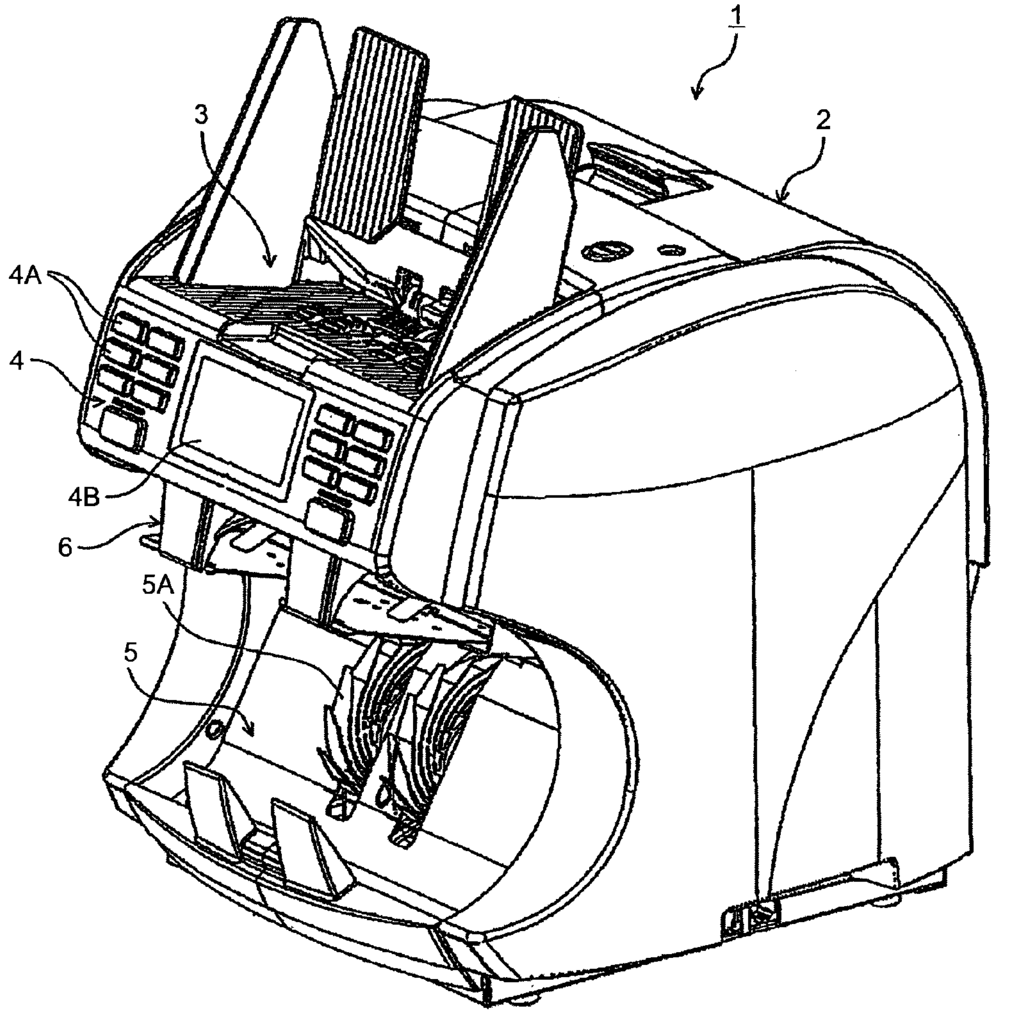
FIG. 1 is an external perspective view of one example of a bill recognizing and counting apparatus according to the present invention.

FIG. 1 is a perspective view of an exterior of a bill recognizing and counting apparatus to which the present invention is applied. In FIG. 1, a bill recognizing and counting apparatus 1 includes a hopper 3, onto which bills are filled in a stacked state, on an upper front of a casing 2, and an operation display unit 4 that performs various setting at the time of performing a counting and recognizing process of the bills and displays a processing state thereof below the hopper 3 at the front of the casing 2. The operation display unit 4 includes a plurality of operation buttons 4A for performing input of a processing operation, and a display panel 4B for displaying input information by the operation buttons 4A and a counting state, so that a bill recognizing and counting process of, for example, bills of different countries is performed by an input operation of the operation buttons 4A.

The bill recognizing and counting apparatus 1 also includes a stacker 5, in which the counted bills are aligned and stacked, on a lower front of the casing 2, and a rejecting unit 6 in which bills excluded from a counting target are stacked, above the stacker 5. A member indicated by reference character 5A is an impeller that catches the bills transported to the stacker 5 to align and stack the bills in the stacker 5.

Figure 2:
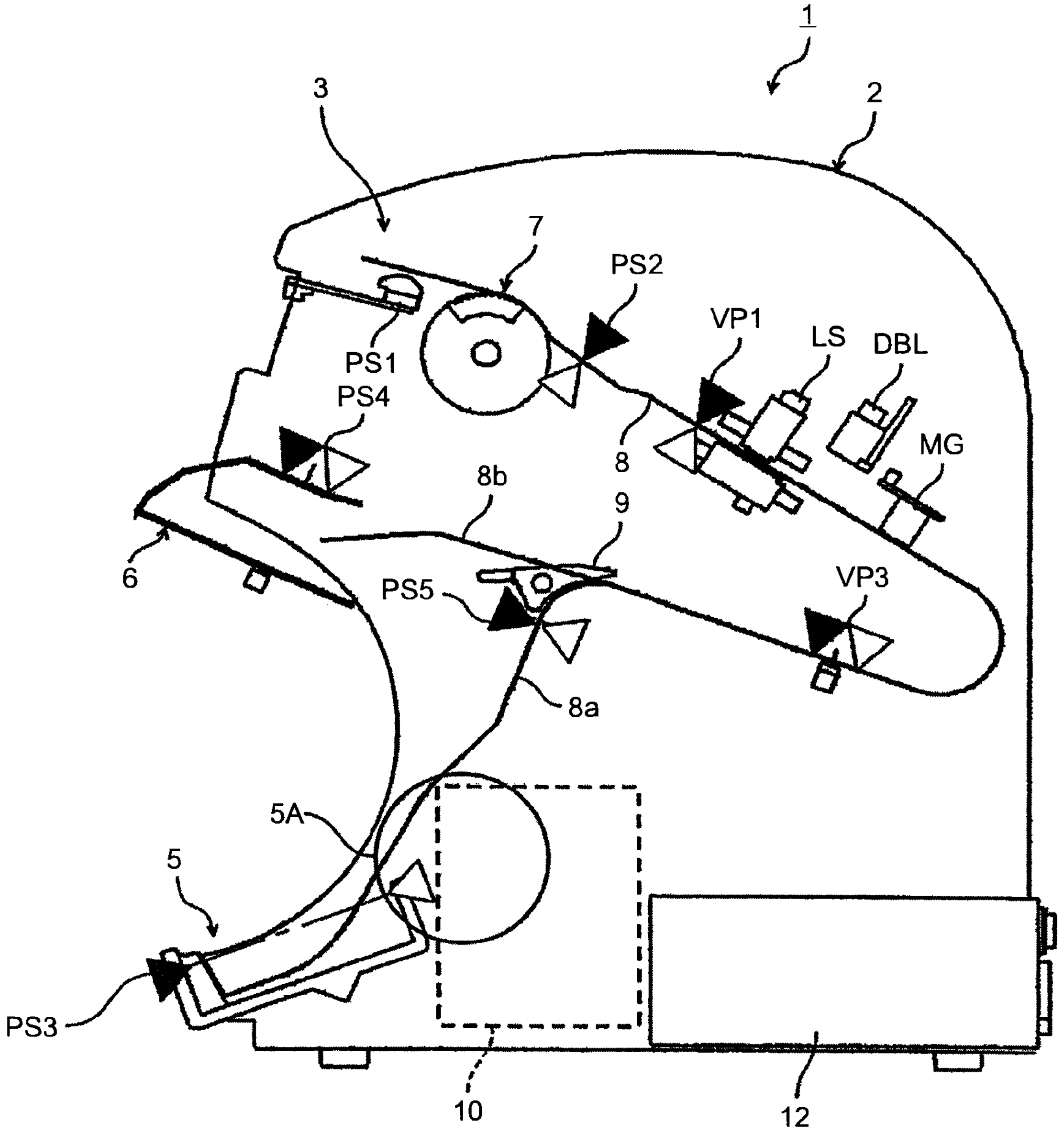
FIG. 2 is a simulated longitudinal sectional view of the bill recognizing and counting apparatus according to the present invention.

FIG. 2 is an explanatory diagram for schematically depicting a transporting mechanism inside the bill recognizing and counting apparatus 1 according to an embodiment of the present invention. In FIG. 2, the hopper 3 includes a hopper sensor PS1 that detects the presence of a bill, and a feeding mechanism 7 that sequentially feeds the bill filled in the hopper 3 from the bottom. The feeding mechanism 7 operates in response to a detection signal from the hopper sensor PS1 or an operation of the operation buttons 4A to feed the bills filled in the hopper 3 to a transport path 8 formed inside the bill recognizing and counting apparatus 1. Power is transmitted to a roller constituting the feeding mechanism 7 via a clutch, so that the roller feeds the bills for a predetermined period, and brakes to prevent follow-up running or double feeding of bills.

Arranged in the transport path 8 are optical sensors PS2 to PS5, VP1, and VP3 including a projector and a photodetector for detecting an abnormal state of the bill being transported (jamming of bills and the like) and the position of the bill.

The feed control sensor PS2 arranged immediately after (on a downstream side) of the feeding mechanism 7 is used for control of the clutch and a brake in the feeding mechanism 7, and the recognition control sensors VP1 arranged on the downstream of the feed control sensor PS2 are used for detecting a bill length (size) and a skew degree of the bill being transported. Arranged on the downstream of the recognition control sensors VP1 are a line sensor LS and magnetic sensors MG constituting a part of a recognizing section, and a double-feed detection sensor DBL that detects whether plural bills are being fed in a stacked state.

Figure 3:
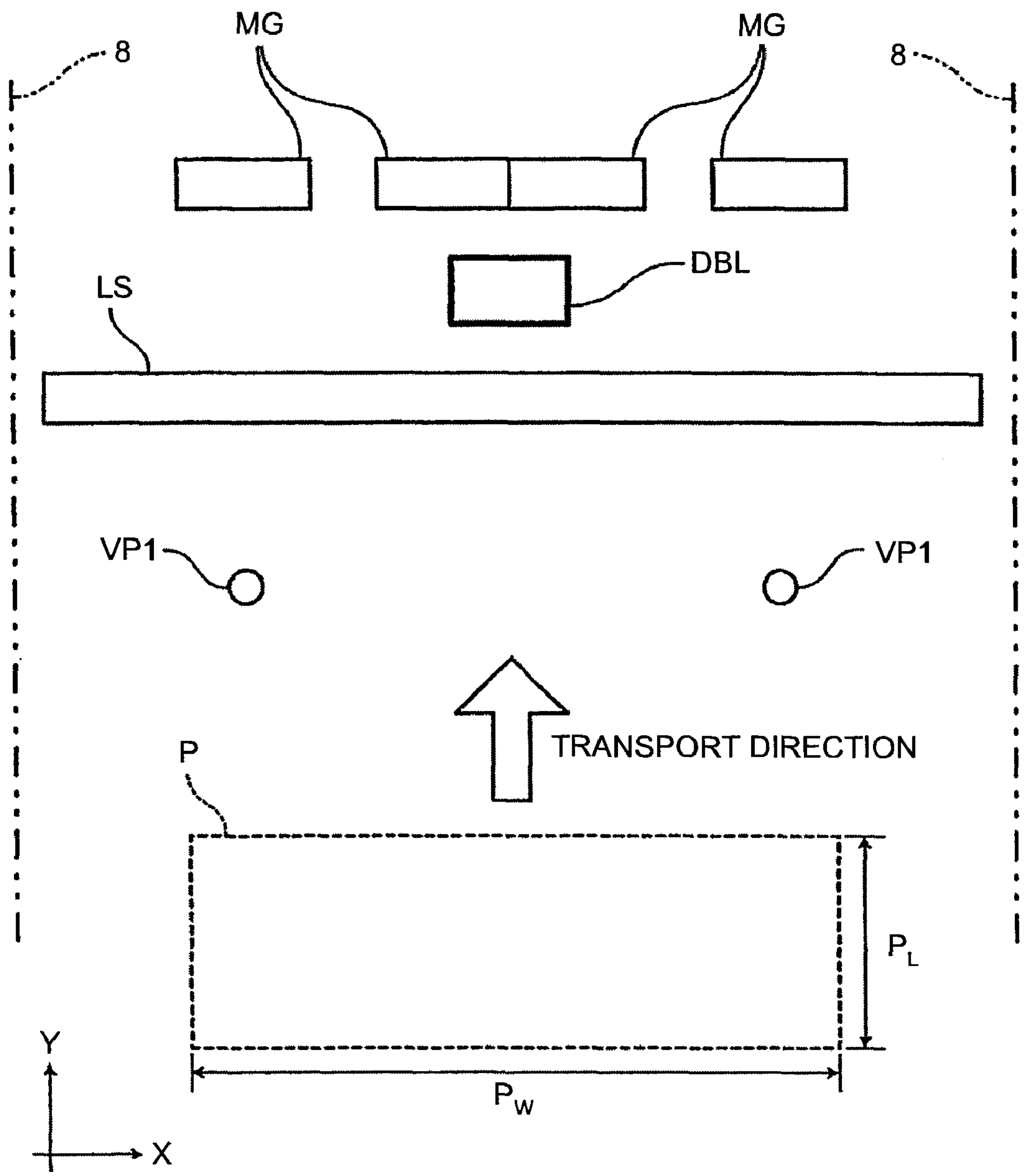
FIG. 3 is a schematic diagram of one example of arrangement and configuration of a main sensor used in the present invention.

A planar arrangement of these sensors (VP1, LS, MG, DBL) on the transport path 8 is as shown in FIG. 3. The recognition control sensors VP1 are timing sensors and used for detecting a bill length $P_L$ (size in Y-direction, which is a transport direction) of a bill P passing therethrough. The line sensor LS includes a reflective sensor using three visible lights of red light, green light, and blue light and a transmission sensor using infrared light, and is used for recognizing the type of the bill P and detecting a direction and a bill width $P_W$ (size in X-direction orthogonal to the transport direction). Meanwhile, the magnetic sensors MG are used for recognizing the authenticity of the bill.

The bill having been subjected to recognition and detection by the various sensors described above is dispatched to the rejecting unit 6 or the stacker 5 by a flipper 9 (a branching member) arranged at a point where the transport path 8 is branched to the rejecting unit 6 and the stacker 5. When a front edge of the bill reaches the distribution control sensor VP3, a solenoid is driven to swing the flipper 9, thereby switching the transport path 8 from a main transport path 8*a* (toward the stacker 5) to a branched transport path 8*b* (toward the rejecting unit 6). The bill determined to be normal by the recognizing section (the bill to be recognized as the counting target) is transported through the flipper 9 along the main transport path 8*a*, counted by the counting sensor PS5, and aligned and stacked in the stacker 5 by the impeller 5A. On the other hand, the bill determined to be a different type or abnormal by the recognizing section (the bill to be excluded from the counting target) is transported along the branched transport path 8*b* to the rejecting unit 6, because the solenoid is operated to swing the flipper 9 as the branching member downward. The presence of the bill in the stacker 5 is detected by the stacker sensor PS3, and the presence of the bill in the rejecting unit 6 is detected by the rejecting unit sensor PS4.

The feeding mechanism of the bill and the impeller 5A are driven by a main motor 10 provided in a lower part of the casing 2. The main motor 10 is stopped when the various sensors described above detect abnormality such as jamming or skewed transport. A power unit 12 that drives the solenoid of the flipper 9, the main motor 10, the various sensors, and a controller described later is provided also in the lower part of the casing 2.

Figure 4:
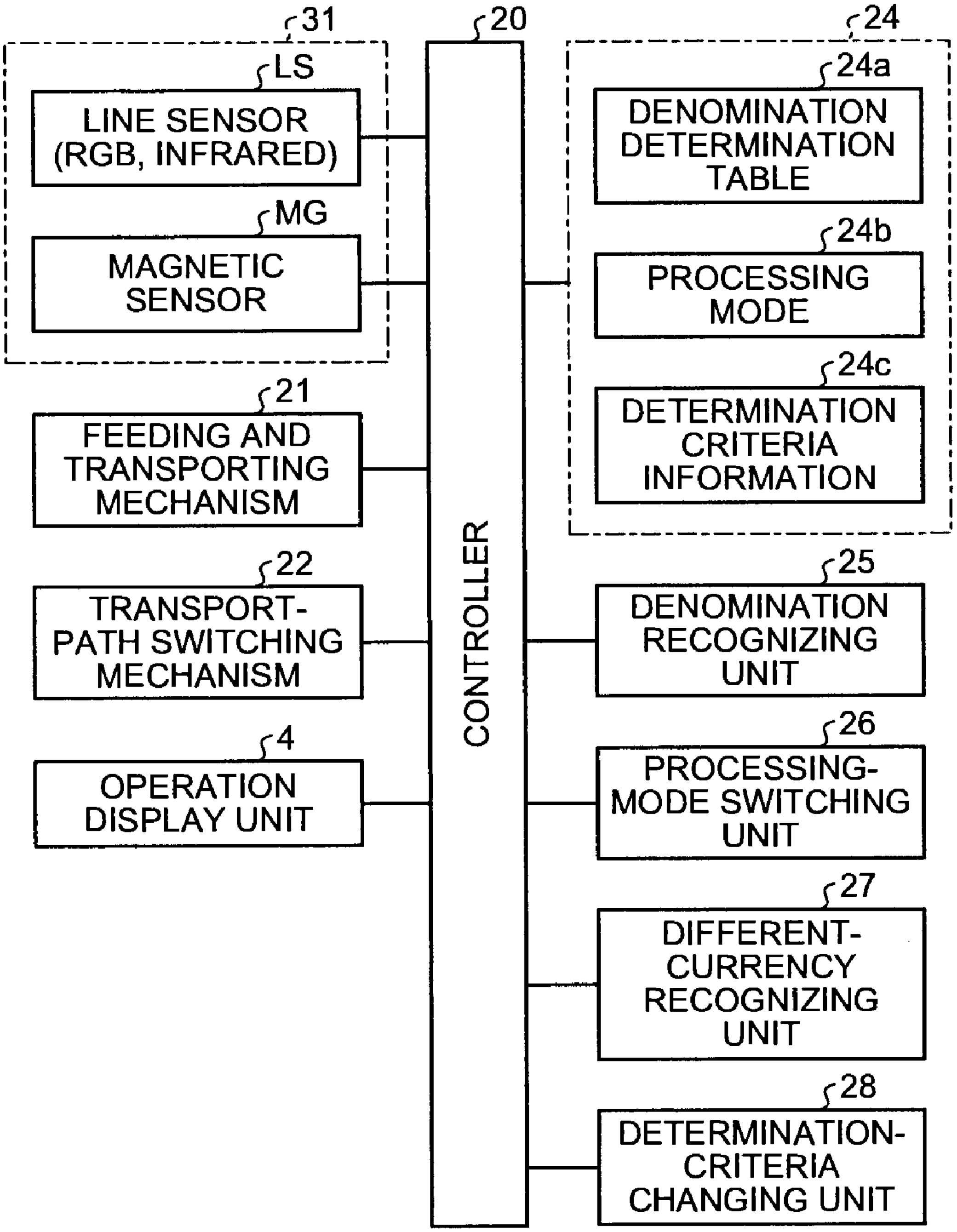
FIG. 4 is a block diagram of a configuration example of a main part of the bill recognizing and counting apparatus according to the present invention.
Figure 5A:
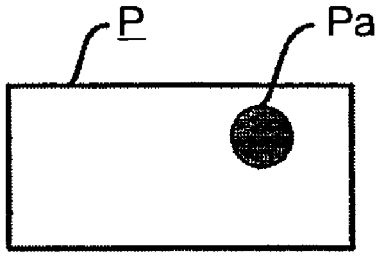
FIGS. 5A to 5D are schematic diagrams of kinds of bill directions.
Figure 5B:
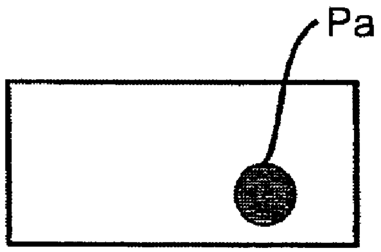
Figure 5C:
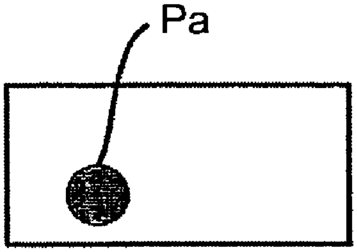
Figure 5D:
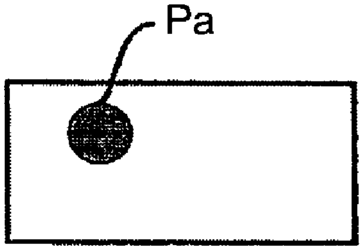

FIG. 4 is a block diagram of a configuration example of a main part of the bill recognizing and counting apparatus according to the present invention. In FIG. 4, a bill detection sensor 31 includes various sensors such as the line sensor LS and the magnetic sensors MG described above. In the present embodiment, the bill detection sensor 31 detects the size of the bill at least in a lengthwise direction (when there is no skew, bill width $P_W$ in FIG. 3=size of the bill in the lengthwise direction) and the color, as well as the presence of reaction of the bill to light of an infrared region, based on data obtained by scanning the bill by the line sensor LS. A magnetic component of the bill (the presence of a magnetic ink or the like) is detected by the magnetic sensors MG.

A feeding and transporting mechanism 21 includes the hopper 3, the stacker 5, the rejecting unit 6, the feeding mechanism 7, a transporting mechanism including the transport path 8 and a transport roller (not shown), and the main motor 10 as a drive source, and feeds and transports the bills received in the hopper 3 to the transport path 8 one by one. The feeding and transporting mechanism 21 in the present embodiment has a gear shift function of a single step or two or more steps, so that a transport interval and transport speed of the bill can be controlled according to a drive command from outside. Further, a feed operation and a transport operation of the bill in the feeding and transporting mechanism 21 are operated relative to one another, and when a drive stop command is received from outside, the feed operation and the transport operation is stopped synchronously.

A transport-path switching mechanism 22 includes the swingable branching member (the flipper 9), the solenoid as the drive source and others. By activating the solenoid, the transport path is switched from the main transport path 8*a* to the branched transport path 8*b* shown in FIG. 2, and the transport path is held on the branched transport path 8*b* side while operating the solenoid. The transport-path switching mechanism 22 is also configured such that by stopping the operation of the solenoid, the transport path is returned to the main transport path 8*a* side and is held on the main transport path 8*a* side, while the operation of the solenoid is stopped.

An operation display unit 4 (see the operation display unit in FIG. 1) includes buttons required for an operator to perform a selecting operation of processing modes and a change operation of a determination criterion (upper-limit and lower-limit thresholds) to be used for the authenticity determination or the like, and also has a display for displaying a processing result and the like.

A storage unit 24 stores therein data and programs required for denomination recognition and authenticity determination of the bills and a counting result of the bills, and is constituted by predetermined recording media such as a ROM and RAM. A denomination determination table 24*a* stored in the storage unit 24 is a table in which data for denomination determination for at least one currency is registered. Recognition data of respective denominations of the bill (hereinafter, "denomination recognition data") is registered in the table for each currency such as Euro, for example. Processing modes 24*b* stored in the storage unit 24 indicates operation modes of the bill recognizing and counting apparatus, and include a "different currency recognition mode" according to the present invention in addition to a "denomination mode" for recognizing the denomination of the bill and a "counting mode" for performing only counting. The "different currency recognition mode" mentioned in the present invention means a mode of performing the processes of the different denomination check and the authenticity determination with respect to a currency other than the currency for which the denomination determination table 24*a* is prepared, in other words, with respect to a currency which does not have the denomination determination table 24*a*. This mode is used when the different denomination check and the authenticity determination are performed for own bills of the EU countries.

Determination criteria information 24*c* stored in the storage unit 24 indicates a criterion at the time of performing the different denomination check and the authenticity determination in the different currency recognition mode. In this example, a difference between detection data of first bill and detection data of each bill of the second bill and thereafter is compared with an allowable range, and if the difference exceeds the allowable range, it is determined that the bill is of a different denomination. Information indicating the allowable range (the upper-limit and lower-limit thresholds) is stored as the determination criteria information 24*c*.

A denomination recognizing unit 25 performs bill recognition with respect to the currency for which the denomination determination table 24*a* is prepared. In the denomination mode, the denomination recognizing unit 25 performs denomination recognition, authenticity determination, and counting the bills for each denomination based on the detection data by the bill detection sensor 31 and the data in the denomination determination table 24*a*.

A processing-mode switching unit 26 switches among the modes described above, and includes a function for automatically switching the denomination mode (initial mode) to the different currency recognition mode, in addition to a function for switching the processing mode according to an operator's operation.

A different-currency recognizing unit 27 performs processes of the different denomination check and the authenticity determination in the different currency recognition mode. The different-currency recognizing unit 27 compares, based on the detection data of the first bill obtained by the line sensor (or the line sensor and the magnetic sensor), a difference between detection data of first bill and detection data of each bill of the second bill and thereafter with the allowable range. The different-currency recognizing unit 27 then performs recognition whether the bill is of a different denomination from the first bill (or the recognition and the authenticity determination of the bill) based on the comparison result.

A determination-criteria changing unit 28 changes set information of the allowable range (the determination criteria information 24*c*) used for the comparison to an allowable range specified by the operator. The determination-criteria changing unit 28 is provided so that setting of the determination criteria information 24*c* to be used for the different denomination check and the authenticity determination can be adjusted to conform to conditions of the bills of each country.

The control unit constituting a controller 20 controls respective mechanisms and respective units connected thereto by means of a predetermined program, and for example, a microprocessor can be used therefor.

Each of the above units 25 to 28 is realized by means of a computer program controlled by the controller 20 in the present embodiment and stored in a predetermined storage medium. Each of the units 25 to 28 operates as a memory-resident program or an overlay program at the time of execution. The respective units 25 to 28 are named and classified according to the function for convenience' sake of explanation, and does not define a software configuration. Further, the recognizing section is constituted by the bill detection sensor 31, the storage unit 24, and the respective units 25 to 28; however, a configuration in which the controller 20 is incorporated in the recognizing section is also included in the present invention.

In the above-described construction, an operation at the time of processing the Euro currency is explained with reference to FIG. 2.

The bill recognizing and counting apparatus according to the present invention is originally designed for the Euro currency, and therefore designation for processing the Euro currency is not necessary. That is, default is set to the Euro currency. Further, as the processing mode, the denomination mode is set as the initial mode.

When the operator places the Euro currency with mixed denomination in the hopper 3 and presses a start button in the operation display unit 4, the feeding mechanism 7 operates to sequentially feed the bills from the bottom. The line sensor LS constituting a part of the recognizing section measures the size of the bill in the lengthwise and widthwise directions and scans an image of the bill. If there is the same kind in the denomination determination table 24*a*, the denomination is determined. The bills determined to be normal by the denomination recognizing unit 25 are counted for each denomination at a point in time when passing through the counting sensor PS5, and aligned and stacked in the stacker 5. On the other hand, when the bill is determined to be abnormal, a transport destination of the bill is switched to the branched transport path 8*b* side by driving of the transport-path switching mechanism 22, and the bill is transported to the rejecting unit 6.

An operation at the time of processing Koruna, the currency of Czech Republic, for which the denomination determination table is not prepared, is explained next.

An operator selects the different currency recognition mode by operating the operation display unit 4.

The different currency recognition mode is based on characteristics of the first encountered bill (in the example, the size of the bill, the presence of magnetism, the presence of reaction to the light of the infrared region, and color), and detection data of the characteristics is stored in the memory.

The different-currency recognizing unit 27 compares detection data of the bill encountered thereafter with the reference data stored in the memory, to guide the bill determined to be different therefrom to the rejecting unit 6.

The bill determined to be different is the one of a different denomination from that of the first bill or a counterfeit bill.

Even if the bills of the same denomination are piled up in the hopper 3 in a different direction, it is not determined to be a different denomination by an operation described below.

As shown in FIGS. 5A to 5D, there are four directions of the bill P. For example, stored in the memory is position information of a pattern Pa shown in the drawings. However, because a computing unit performs comparison in four directions of the bill P, an error in determination does not occur even if the direction is different. Specifically, when performing the comparison by using the reference data stored in the memory (for example, image data in two-dimensional arrays by means of RGB and the infrared light) and the detection data of the second bill and thereafter, the different-currency recognizing unit 27 changes over the sequence of either one of the two-dimensional array data to perform comparison in the four directions of the bill P.

Figure 6:
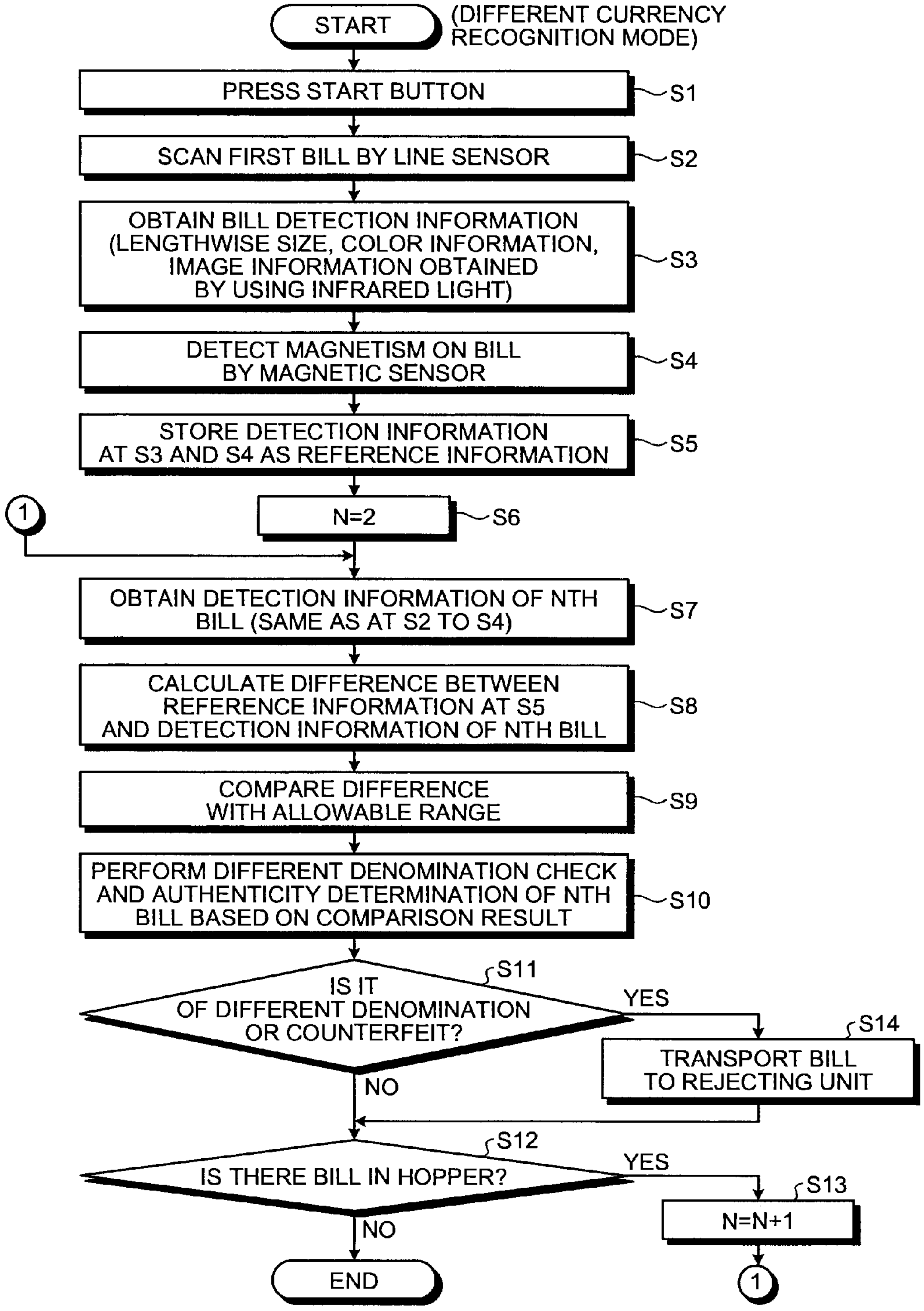
FIG. 6 is a flowchart for explaining details of processing in a different currency recognition mode according to the present invention.

Processes of the different denomination check and the authenticity determination in the different currency recognition mode are explained by a specific example with reference to a flowchart in FIG. 6.

Figure 7:
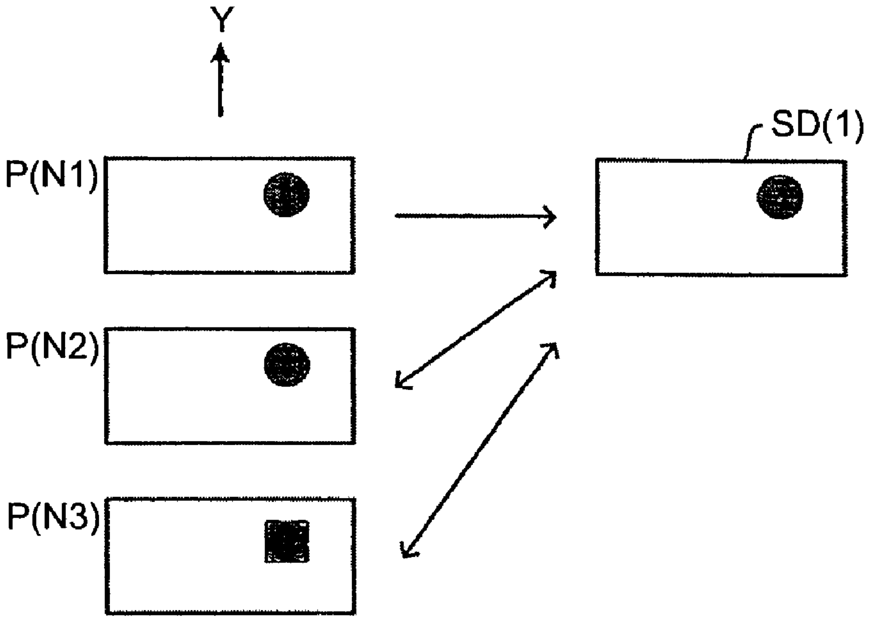
FIG. 7 is a schematic diagram for explaining a relation between a bill to be transported and reference information to be used in the different currency recognition mode.

In the different currency recognition mode, the different denomination check (check whether bill(s) of a different denomination is mixed in the bills) and the authenticity determination of each bill are performed with respect to the bills of the same denomination. As shown in FIG. 7, it is assumed here that the first encountered bill P (N1) is designated as a reference, and the second bill P (N2) is the same as the first bill P (N1), but the third bill P (N3) is different therefrom, for example.

First, the operator selects the different currency recognition mode by operating the operation display unit 4, to change the processing mode from the denomination mode to the different currency recognition mode. When the operator presses the start button in a state with a plurality of bills being piled up in the hopper 3 (Step S1), the feeding mechanism 7 operates to sequentially feed the bills from the bottom. When the first bill P (N1) passes through the line sensor LS (see FIG. 3), an image of the bill P (N1) shown in FIG. 6 is scanned (Step S2), to collect image data of the bill P (Ni). The image data collected by the line sensor LS in this example is data by means of the infrared light (a quantity of light of the infrared region having passed through the bill) and color data by means of any one light of R (red light), G (green light), and B (blue light) (preferably, quantities of reflected lights of the respective irradiation lights of RGB from the bill). The different-currency recognizing unit 27 extracts an edge of the bill based on the image data of the bill, to calculate a lengthwise size (size in the lengthwise direction) of the bill. At this time, not only the lengthwise size but also a widthwise size (size in the widthwise direction) of the bill may be calculated. Further, the widthwise size of the bill may be obtained based on a detection signal of the recognition control sensor VP1 instead of the image data from the line sensor LS. That is, the bill length $P_L$ (the size of the bill in the Y-direction which is the transport direction) is detected according to the detection signal of the bill by the recognition control sensor VP1, and the skew degree of the bill is detected based on a passing timing of the bill with respect to the two recognition control sensors VP1, thereby obtaining the widthwise size of the bill based on these pieces of detection information (Step S3).

When the first bill P (N1) passes through the magnetic sensors MG shown in FIG. 3, the magnetism of the bill is detected by the magnetic sensors MG, and when the magnetism is detected, the magnetic sensors MG output a detection signal. The different-currency recognizing unit 27 detects the presence of the magnetism of the first bill P (N1) according to the presence of the detection signal of the magnetic sensors MG (Step S4).

Detection information of the first bill P (N1) obtained by processes at Steps S2 to S4 is stored in the memory as reference information SD (1) to be used in subsequent steps. Specifically, the different-currency recognizing unit 27 stores, as the reference information SD (1), size information of the first bill P (N1) (in this example, data indicating the size of the bill including at least the lengthwise size obtained at Step S3), color information (image data of the bill based on at least one light of the red right, green light, and blue light), image information of the infrared region (image data of the bill by means of the infrared light), and magnetism information (data indicating the presence of the magnetism of the bill) (Step S5). The different-currency recognizing unit 27 then counts up the counter N to 2, which indicates a count order of the next bill, and subsequently performs the process for the second bill thereafter (Step S6).

In the present embodiment, the lengthwise size of the bill is used as an element of the determination criteria information 24*c*, however, by also detecting the widthwise size, both of the lengthwise size and the widthwise size can be used, or the widthwise size can be used instead of the lengthwise size as the element of the determination criteria information 24*c*.

Subsequently, the different-currency recognizing unit 27 obtains the detection information of the second bill P (N2) in the same manner as the detection information of the first bill P (N1) obtained in the processes at Steps S2 to S4, when the second bill P (N2) passes through the line sensor LS and the magnetic sensors MG (Step S7).

Then, a difference between the detection information of the second bill P (N2) and the reference information SD (1) at Step S5 is calculated for each reference element (Step S8), and compares the difference for each reference element with the determination criteria information 24*c* (information indicating the allowable range) (Step S9).

Here, the determination criteria information 24*c* to be used at Step S9 is explained by a specific example.

Determination criteria information of the lengthwise size (allowable range of the difference from the first bill) is, for example, ±1 to 15 millimeters, and when the widthwise size is added as the element of the criteria information, the determination criteria information is, for example ±1 to 15 millimeters.

As for the determination criteria information for determining that there is a reaction to an infrared light, an A/D converted value of an infrared detection signal output from one channel of the line sensor is from 0 to 255, and a threshold for generally determining that there is the reaction to the infrared light from the image data of the bill (two-dimensional array data) by means of the infrared light is from 1 to 15. However, in such a configuration that the line sensor outputs a signal indicating the presence of detection of the infrared light, the determination criteria information is not required.

As for the determination criteria information for determining the presence of the magnetism, in the threshold for determining that there is the magnetism, the threshold of the magnetic detection signal in one magnetism detection element is from 0 to 255, and the threshold for generally determining that there is the reaction to the infrared light is from 1 to 15. However, in such a configuration that the magnetic sensor outputs a signal indicating the presence of detection, the determination criteria information is not required.

The threshold for generally determining that the bill is the same as the first bill from the image data of the bill (two-dimensional array data) by means of the R, G, and B lights output from the line sensor is from 1 to 15. There is another mode in which the bill is determined by dividing the area of the bill and obtaining a mean value or the like for individual divided block. In this case, the determination criteria information is prepared for each divided block, and the threshold as the determination criteria information is the upper-limit and lower-limit thresholds as in the respective thresholds described above.

Setting of the respective pieces of determination criteria information can be changed by the determination-criteria changing unit 28 to conform to conditions of the bills of each country.

At the time of comparing the difference for each criteria element with the determination criteria information 24*c* at Step S9, the different-currency recognizing unit 27 uses the pieces of determination criteria information to perform comparison for each of the determination criteria information. The different-currency recognizing unit 27 then performs the different denomination check and the authenticity determination for the Nth bill based on the comparison result. At this time, the different-currency recognizing unit 27 designates at least the lengthwise size of the bill as an essential element of the criterion. For other elements (in this example, color information, image information of the infrared region, and the presence of magnetism), the different-currency recognizing unit 27 adds at least one element to perform the different denomination check and the authenticity determination. A collation process based on the image information is a known technique by the present applicant, and therefore explanations thereof are omitted.

Regarding the different denomination check and the authenticity determination, the different-currency recognizing unit 27 presets therein a combination of respective elements at the time of performing determination for "different denomination" and "authenticity", and determines the "different denomination" and "authenticity" according to the combination of respective elements (Step S10). For example, when comparing a difference between the reference information SD (1) of the first bill P (N1) and the detection information of the second bill P (N2) with the allowable range, the different-currency recognizing unit 27 determines the bill as "different denomination" if at least a difference in the lengthwise size exceeds the allowable range, or determines the bill as "counterfeit" if the difference in the size exceeds the allowable range and a difference in any one of the color, infrared, and magnetism elements exceeds the allowable range. Preferably, the combination used in the determination at Step S10 can be changed by the determination-criteria changing unit 28 to conform to conditions of bills of each country.

In the determination at Step S10, it is determined whether the Nth bill is of a different denomination or counterfeit (Step S11), and if the bill is neither the different denomination nor counterfeit, that is, the Nth bill is of the same denomination as the first bill, and is determined as "true", the Nth bill is aligned and stacked in the stacker 5, after a discrete value of normal bills is updated at the time of passing through the counting sensor PS5. Concurrently, in the different-currency recognizing unit 27, the hopper sensor PS1 detects whether there is a bill in the hopper 3 (Step S12). When there is a bill, 1 is added to the counter N (Step S13), and the process proceeds to Step S7 to continue the process for the next bill.

On the other hand, at Step S11, when the bill is determined to be of the different denomination or counterfeit (in the example in FIG. 6, the third bill P (N3)), the transport destination is switched to the branched transport path 8*b* side by driving of the transport-path switching mechanism 22, so that the bill is transported to the rejecting unit 6 (Step S14), and the process proceeds to Step S12 to continue the process for the next bill.

In the operation example described above, an example in which when the bill is determined as different denomination or counterfeit at Step S11, the bill is transported to the rejecting unit 6 to continue the process has been explained. However, such a configuration that the feeding and transporting mechanism 21 is stopped at a point in time when the bill is determined as different denomination or counterfeit can be also used.

An embodiment in which the bill processing mode is automatically switched to the different currency recognition mode, to perform a process such as the different denomination check is explained next.

In the above embodiment, an example in which the process in the different currency recognition mode is started after the operator changes the denomination mode to the different currency recognition mode and presses the start button has been explained. However, the bill recognizing and counting apparatus according to the present embodiment includes a function of automatically switching the denomination mode (initial mode) to the different currency recognition mode.

Figure 8:
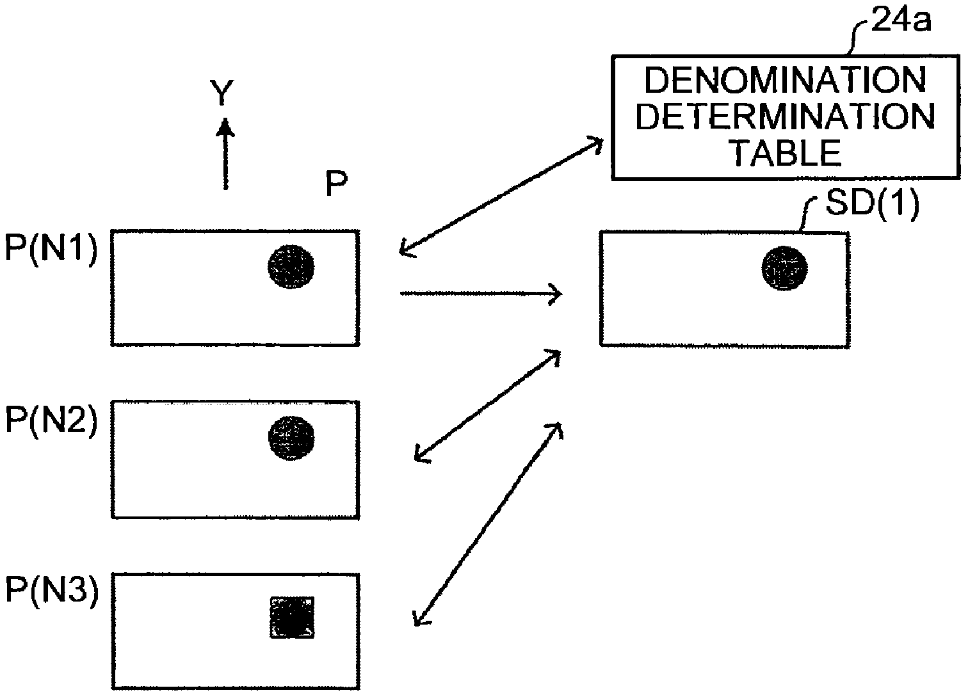
FIG. 8 is a schematic diagram for explaining a function for automatically switching a bill processing mode to the different currency recognition mode.

This function is explained below with reference to FIG. 8.

When the operator places the bills in the hopper and presses the start button on the operation display unit, the bill recognizing and counting apparatus first operates in the denomination mode. The denomination recognizing unit performs a process for recognizing the denomination of the currency by referring to the denomination determination table for the first bill. At this time, when it is determined that denomination recognition data of the first bill P (N1) has not been registered in the denomination determination table 24*a*, the processing-mode switching unit switches the bill processing mode from the denomination mode to the different currency recognition mode, and activates the different-currency recognizing unit.

The different-currency recognizing unit activated by the processing-mode switching unit starts a process at Step S5 in FIG. 6, to perform the process in the different currency recognition mode. The process at Step S6 and thereafter is the same as described above, and therefore explanations thereof are omitted.

The detection data output from the various sensors in the denomination mode includes data collected by the different-currency recognizing unit, and common data to be used by the denomination recognizing unit and the different-currency recognizing unit is stored in the same storage destination (logical address) in the memory.

Therefore, the different-currency recognizing unit can directly use the data collected by the denomination recognizing unit.

As described above, in the different currency recognition mode, the same sensor as the sensor that performs denomination recognition is used. Therefore, the same apparatus can perform the denomination recognition of the Euro bills and the different denomination check and the authenticity determination with respect to the bills of different countries without adding a new sensor.

In the respective embodiments described above, the explanation has been made about an example of using the Euro currency as an example of the currency common to different countries. However, the bill recognizing and counting apparatus according to the present invention is also applicable to common currencies other than the Euro currency. The bill recognizing and counting apparatus having the "counting mode" for performing only the counting has been explained as an example; however, the present invention is also applicable to a bill recognizing and counting apparatus which does not have the "counting mode". Further, the explanation has been made about an example in which in the different currency recognition mode, as the criterion for the different denomination check and the authenticity determination, the size of the bill is used as the essential element, and all other elements of (a) color information, (b) image information of the infrared region, and (c) the presence of magnetism are included as other elements. However, only one element among the other elements (a) to (c) can be used. Further, the bill recognizing and counting apparatus in which the widthwise direction of the bill is designated as the transport direction has been explained. However, the present invention is also applicable to a bill recognizing and counting apparatus in which the lengthwise direction of the bill is designated as the transport direction.

INDUSTRIAL APPLICABILITY

The bill recognizing and counting apparatus according to the present invention is designed for the bills. However, the present invention can be also applied to a recognizing and counting apparatus designed for paper sheets other than the bills (securities and cash vouchers such as gift certificates). Further, while the present invention is preferably applied to a desktop bill recognizing and counting apparatus as shown in the drawings, the present invention is also applicable to widely-used bill recognizing and counting apparatus having a general size.

The invention claimed is:

1. A bill recognizing and counting apparatus comprising:

a feeding and transporting mechanism configured to feed a plurality of bills placed on a hopper to a transport path one by one and configured to transport the plurality of bills to a stacker or a rejecting unit;

a line sensor provided at a predetermined position of the transport path and configured to scan an image of a given bill from the plurality of bills being transported;

a denomination determination table in which denomination recognition data is registered for at least one currency;

a denomination recognizing unit configured to recognize a denomination of the at least one currency by referring to the denomination determination table;

a processing-mode switching unit configured to switch between a denomination recognition mode for the at least one currency that has its denomination recognition data registered in the denomination determination table, and a different currency recognition mode for a currency that has its denomination recognition data not registered in the denomination determination table;

a different-currency recognizing unit configured to compare a difference in size between a first bill and subsequent bills with an allowable range when the different currency recognition mode is set, the different-currency recognizing unit being configured to recognize whether a subsequent bill is of a same denomination as the first bill based on a comparison result; and a control unit configured to perform control for guiding one of the subsequent bills to the rejecting unit or to perform control for stopping the feeding and transporting mechanism when the one of the subsequent bills is determined to be a different denomination from the denomination of the first bill by the different-currency recognizing unit.

2. The bill recognizing and counting apparatus according to claim 1, wherein the line sensor is configured to identify color of the given bill, and wherein, when the different currency recognition mode is set, the different-currency recognizing unit performs a denomination recognition and an authenticity determination of the one of the subsequent bills, based on color information and size of the one of the subsequent bills.

3. The bill recognizing and counting apparatus according to claim 1, wherein the line sensor is configured to scan the image of the given bill by using infrared light, and wherein, when the different-currency recognition mode is set, the different-currency recognizing unit is configured to perform a denomination recognition and an authenticity determination of the one of the subsequent bills, based on image information obtained by using the infrared light and size of the one of the subsequent bills.

4. The bill recognizing and counting apparatus according to claim 1, further comprising a magnetic sensor configured to detect a presence of magnetism on the given bill, and wherein, when the different currency recognition mode is set, the different-currency recognizing unit is configured to perform a denomination recognition and an authenticity determination of the one of the subsequent bills based on the presence of magnetism and size of the one of the subsequent bills.

5. The bill recognizing and counting apparatus according to claim 1, wherein the denomination recognizing unit is configured to determine if the given bill is the denomination of the at least one currency by referring to the denomination determination table, wherein, when a determination is made that denomination recognition data of the given bill is not registered in the denomination determination table, the processing-mode switching unit is configured to automatically switch between the denomination recognition mode to the different currency recognition mode such that the given bill is processed as the first bill in the different currency recognition mode.

6. The bill recognizing and counting apparatus according to claim 1, further comprising a determination-criteria changing unit configured to change set information of the allowable range to another allowable range specified by an operator.

7. A bill recognizing and counting apparatus comprising:

a feeding and transporting mechanism configured to feed a plurality of bills placed on a hopper to a transport path one by one and configured to transport the plurality of bills to a stacker or a rejecting unit;

a line sensor provided at a predetermined position of the transport path and configured to scan an image of a given bill of the plurality of bills being transported;

a denomination determination table in which denomination recognition data is registered for at least one currency;

a denomination recognizing unit configured to recognize a denomination of the at least one currency by referring to the denomination determination table;

a magnetic sensor configured to detect a presence of magnetism on the given bill;

an infrared sensor configured to detect a presence of a reaction of the given bill to infrared light;

a processing-mode switching unit configured to switch between a denomination recognition mode for the at least one currency that has its denomination recognition data registered in the denomination determination table, and a different currency recognition mode for a currency that has its denomination recognition data not registered in the denomination determination table;

a different-currency recognizing unit configured to compare a difference in a size obtained by scanning by the line sensor, the presence of magnetism obtained by the magnetic sensor, and the presence of the reaction to the infrared light obtained by the infrared sensor between a first bill and subsequent bills with a corresponding allowable range when the different currency recognition mode is set, the different-currency recognizing unit being configured to recognize whether a subsequent bill is of a same denomination as the first bill and whether the subsequent bill is authentic based on a comparison result; and a control unit configured to perform control for guiding one of the subsequent bills to the rejecting unit or to perform control for stopping the feeding and transporting mechanism when the one of the subsequent bills is determined to be a different denomination from the denomination of the first bill or counterfeit by the different-currency recognizing unit.

* * * * *